United States Patent [19]

Gelhaar et al.

[11] Patent Number: 4,725,503

[45] Date of Patent: Feb. 16, 1988

[54] PIGMENTED POLYAMIDE ANCHORING WIRE

[75] Inventors: Hans-Georg Gelhaar, Dormagen; Rudolf Braeckeler, Cologne, both of Fed. Rep. of Germany; Robert McDonald; Richard Buechele, both of Victoria, Australia

[73] Assignee: Bayer Aktiengesellschaft, Leverkusen, Fed. Rep. of Germany

[21] Appl. No.: 770,896

[22] Filed: Aug. 29, 1985

[30] Foreign Application Priority Data

Feb. 28, 1985 [NZ] New Zealand .................. 211260

[51] Int. Cl.⁴ .................. B32B 15/08; C08L 31/00; C08L 29/00; C08L 77/00
[52] U.S. Cl. .................. 428/458; 428/209; 525/183; 525/219; 525/430; 525/432; 525/434; 525/436; 525/437
[58] Field of Search .............. 525/183, 430, 432, 436, 525/437, 219; 428/209, 458

[56] References Cited

U.S. PATENT DOCUMENTS

| | | | |
|---|---|---|---|
| 3,865,904 | 2/1975 | Wingler et al. | 260/901 |
| 3,894,114 | 7/1975 | Lohmann et al. | 260/857 PA |
| 3,903,046 | 9/1975 | Greber et al. | 260/47 CP |
| 3,947,528 | 3/1976 | Wingler et al. | 260/901 |
| 4,061,708 | 12/1977 | Lazarus et al. | 264/211 |
| 4,124,651 | 11/1978 | Lohmann et al. | 260/857 PA |
| 4,234,184 | 11/1980 | Deleens et al. | 273/235 R |
| 4,247,427 | 1/1981 | Edinger | 260/26 |
| 4,292,194 | 9/1981 | Perazzoni et al. | 252/400 R |
| 4,443,573 | 4/1984 | Wells et al. | 524/308 |

FOREIGN PATENT DOCUMENTS 1311526 3/1973 United Kingdom .

Primary Examiner—John E. Kittle
Assistant Examiner—Patrick J. Ryan
Attorney, Agent, or Firm—Sprung Horn Kramer & Woods

[57] ABSTRACT

Wires of poly-$\epsilon$-caprolactam with a diameter of from 2 to 8 mm and a strength of from 35 to 45 cN/tex containing from 0.1 to 10% by weight, based on poly-$\epsilon$-caprolactam, of titanium dioxide pigment are useful as anchoring wires in the cultivation of wine and fruit and for fences around pasture land.

2 Claims, No Drawings

PIGMENTED POLYAMIDE ANCHORING WIRE

This invention relates to pigmented polyamide anchoring wire for use in the cultivation of wine and fruit and for fences around pasture land.

It is known to use polyamide wires, which are pigmented with carbon black, and are therefore black in color, as anchoring wires in the cultivation of wine and fruit (Bayco®-wire by Bayer AG, Leverkusen). The wires are particularly weather-resistant due to the addition of carbon black. These wires are, therefore, unsuitable for fences around pasture land, since being black in colour, they can not be seen or only barely seen by animals.

This invention sets out to provide polyamide wires which are clearly visible and in addition are particularly weather-resistant, especially in warm, dry climates.

It has now been found that this object can be achieved with a certain polyamide which is pigmented with specific pigment.

Thus, an object of the invention is the use of a polyamide wire as anchoring wire in the cultivation of wine and fruit, and for fences around pasture land, characterised in that the wire consists of poly-$\epsilon$-caprolactam, has a diameter of from 2 to 8 mm and a strength of from 35 to 45 cN/tex, and contains from 0.1 to 10, preferably 0.3 to 3% by weight, based on poly-$\epsilon$-caprolactam, titanium dioxide pigment.

The polyamide preferably has a molecular weight of from 25,000 to 35,000 (numerical average) and is spun in conventional manner from the melt, to which the required quantity of pigment has been added, and is stretched from 1:3.5 to 1:4.5.

Furthermore, the polyamide may be stabilized by addition of from 5 to 250 mg $Cu^+$/kg, preferably 10 to 100 mg $Cu^+$/kg. A suitable copper compound is CuI.

The titanium dioxide may be in the anatase modification, but is preferably in the rutile modification.

What is claimed is:

1. An anchoring wire for use in the cultivation of wine and fruit, and for fences around pasture land, consisting essentially of poly-$\epsilon$-caprolactam having a molecular weight of from 25,000 to 35,000 (numerical average) and stabilised by addition of 10 to 100 mg $Cu^+$/kg, with a diameter of from 2 to 8 mm and a strength of from 35 to 45 cN/tex, and a content of from 0.3 to 3% by weight, based on poly-$\epsilon$-caprolactam, of rutile titanium dioxide pigment.

2. An anchoring wire of claim 1, wherein the copper compound providing the $Cu^+$ is CuI.

* * * * *